US007080173B2

(12) United States Patent
Han et al.

(10) Patent No.: US 7,080,173 B2
(45) Date of Patent: Jul. 18, 2006

(54) REDUCING INFORMATION RECEPTION DELAYS

(75) Inventors: Mu Han, Redmond, WA (US); Andres Vega Garcia, Newcastle, WA (US); Wei Zhong, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 195 days.

(21) Appl. No.: 10/856,254

(22) Filed: May 27, 2004

(65) Prior Publication Data

US 2006/0041698 A1    Feb. 23, 2006

(51) Int. Cl.
  G06F 13/42    (2006.01)
  G06F 15/16    (2006.01)
(52) U.S. Cl. ..................... 710/106; 709/231
(58) Field of Classification Search ............ 710/106; 709/231
   See application file for complete search history.

(56) References Cited

U.S. PATENT DOCUMENTS

| 6,496,477 | B1 * | 12/2002 | Perkins et al. .............. 370/228 |
| 6,804,244 | B1 * | 10/2004 | Anandakumar et al. ............ 370/395.21 |
| 2002/0126668 | A1 * | 9/2002 | Horowitz et al. ............ 370/389 |
| 2003/0118042 | A1 * | 6/2003 | Nishida et al. ............ 370/404 |

FOREIGN PATENT DOCUMENTS

| EP | 1 179 925 | 2/2002 |
| WO | WO 02/067497 | 8/2002 |

OTHER PUBLICATIONS

"Application performance pitfalls and TCP's Nagle Algorithm", Minshall et al. published in the Performance Evaluation Review, Mar. 2000, vol. 27, No. 4, pp. 36-44.*
"Rethinking the TCP Nagle Algorithm"; Mogul et al. published in the Computer Communication Review, Jan. 2001, vol. 31, No. 1, pp. 6-20.*
Hacker, Thomas J. et al., "The Effects of Systemic Packet Loss on Aggregate TCP Flows," IEEE, 2002 (15 Pages).
Pan, Yi, et al., "An End-to-End Multi-Path Smooth Handoff Scheme for Stream Media," WMASH '03, Sep. 19, 2003, San Diego, CA, Copyright 2003 ACM (11 Pages).

* cited by examiner

Primary Examiner—Rehana Perveen
Assistant Examiner—Brian Misiura
(74) Attorney, Agent, or Firm—Perkins Coie LLP

(57) ABSTRACT

A technique for reducing information reception delays is provided. The technique reduces delays that may be caused by protocols that guarantee order and delivery, such as TCP/IP. The technique creates multiple connections between a sender and recipient computing devices and sends messages from the sender to the recipient on the multiple corrections redundantly. The recipient can then use the first arriving message and ignore the subsequently arriving redundant messages. The recipient can also wait for a period of time before determining which of the arrived messages to use. The technique may dynamically add connections if messages are not consistently received in a timely manner on multiple connections. Conversely, the technique may remove connections if messages are consistently received in a timely manner on multiple connections. The technique can accordingly be used with applications that are intolerant of data reception delays such as Voice over IP, real-time streaming audio, or real-time streaming video.

19 Claims, 6 Drawing Sheets

REDUCING INFORMATION RECEPTION DELAYS

TECHNICAL FIELD

The described technology relates generally to data communications and, more particularly, to methods and systems for reducing information reception delays.

BACKGROUND

Transmission Control Protocol ("TCP") is a connection-oriented, reliable delivery transport layer protocol. TCP is typically described as a transport layer that provides an interface between an application layer and a network layer. The application layer generally communicates with the TCP layer by sending or receiving a stream of data (e.g., a number of bytes of data). TCP organizes this datastream into segments that can be carried by the protocol employed at the network layer, e.g., the Internet Protocol ("IP"). These segments are commonly referred to as "packets," "frames," or "messages." TCP and IP are often jointly referred to as TCP/IP. The application, transport, and network layers, together with other layers, are jointly referred to as a data communications stack.

Clients and servers communicate with one another using TCP by establishing a connection between one another. When establishing a connection, a server typically opens a "socket" and listens passively for a connection request from a client. The client requests to open a connection by sending a signal to the server's socket, which the server acknowledges to open the connection. Once a connection is established, the client and server can exchange messages.

TCP guarantees order and delivery of messages by adding or verifying sequence numbers in the messages. The sender of messages adds a sequence number to each message it sends. The receiver of the messages acknowledges delivery of the messages by returning the sequence number of the received messages in acknowledgment messages. When the sender does not receive in a timely manner an acknowledgement for a message it sent, the sender assumes that the message was lost and re-sends the message. In a variation of this method of guaranteeing order and delivery, a "sliding window" of messages may be used. When using a sliding window method, the sender may send multiple messages, each with a different sequence number, without waiting for an acknowledgement for each sent message before sending another message. The sender may then send additional messages after receiving an acknowledgment for one or more messages in the previously sent window, or may re-send messages for which an acknowledgment is not received in a timely manner. Thus, by sending, acknowledging, and verifying sequence numbers, TCP guarantees order and delivery of messages.

When a protocol of a layer of a data communications stack guarantees order and delivery of messages, higher levels of the data communications stack, such as an application or session layer, do not need to be concerned that data will be lost or may arrive in an unintended sequence. As an example, if a client application sends a message to a database server indicating to set a value to 5, then sends a message indicating to set the value to 10, and finally sends a message indicating to multiply the value by 3, the final result would be different depending on whether all messages arrived at the server, and whether they arrived in the intended order. An application using a TCP transport layer can be assured that the final result will be 30, but an application using an alternate transport layer may have no such assurance. Because TCP guarantees order and delivery of messages, it is commonly employed in intranets, the Internet, and other networks employing unreliable lower layers of a data communications stack.

Although TCP guarantees the order and delivery of messages, it does not guarantee the time of delivery. The timing of message delivery can be unpredictable because messages may travel over different network routes, the sender may attempt multiple retransmissions before receiving an acknowledgment, or because of other reasons beyond an application's (or transport layer's) control. As a result, the difference in time between two received messages may be substantially greater than the difference between the times the messages were sent.

These delays may create problems for some types of applications. As an example, client applications that receive audio (e.g., "Voice over IP" or streaming audio) or video (e.g., streaming video) from a server may need to receive messages containing the audio or video without significant delays between the messages. Otherwise, a listener or viewer may perceive gaps in the received audio or video information. When applications desire to minimize or eliminate such delays, they may use a transport protocol other than TCP. However, these other transport protocols may not guarantee order and delivery. Moreover, these other transport protocols may not be as commonly employed as TCP, and so messages sent using these transport protocols may not be capable of being distributed as widely as when sent using TCP.

A technique for using protocols that guarantees order and delivery, such as TCP, to deliver data to applications that have a low tolerance for delays would thus have significant utility.

SUMMARY

A technique for reducing information reception delays is provided. The technique reduces delays that may be caused by protocols that guarantee order and delivery, such as TCP/IP. The technique creates multiple connections between a sender and recipient computing device and sends messages from the sender to the recipient on the multiple connections redundantly. The recipient can then use the first arriving message and ignore the subsequently arriving redundant messages. The recipient can also wait for a period of time before determining which of the arrived messages to use. The technique may dynamically add connections if messages are not consistently received in a timely manner on multiple connections. Conversely, the technique may remove connections if messages are consistently received in a timely manner on multiple connections. The technique can accordingly be used with applications that are intolerant of data reception delays such as Voice over IP, real-time streaming audio, or real-time streaming video.

DETAILED DESCRIPTION

Figure 1:
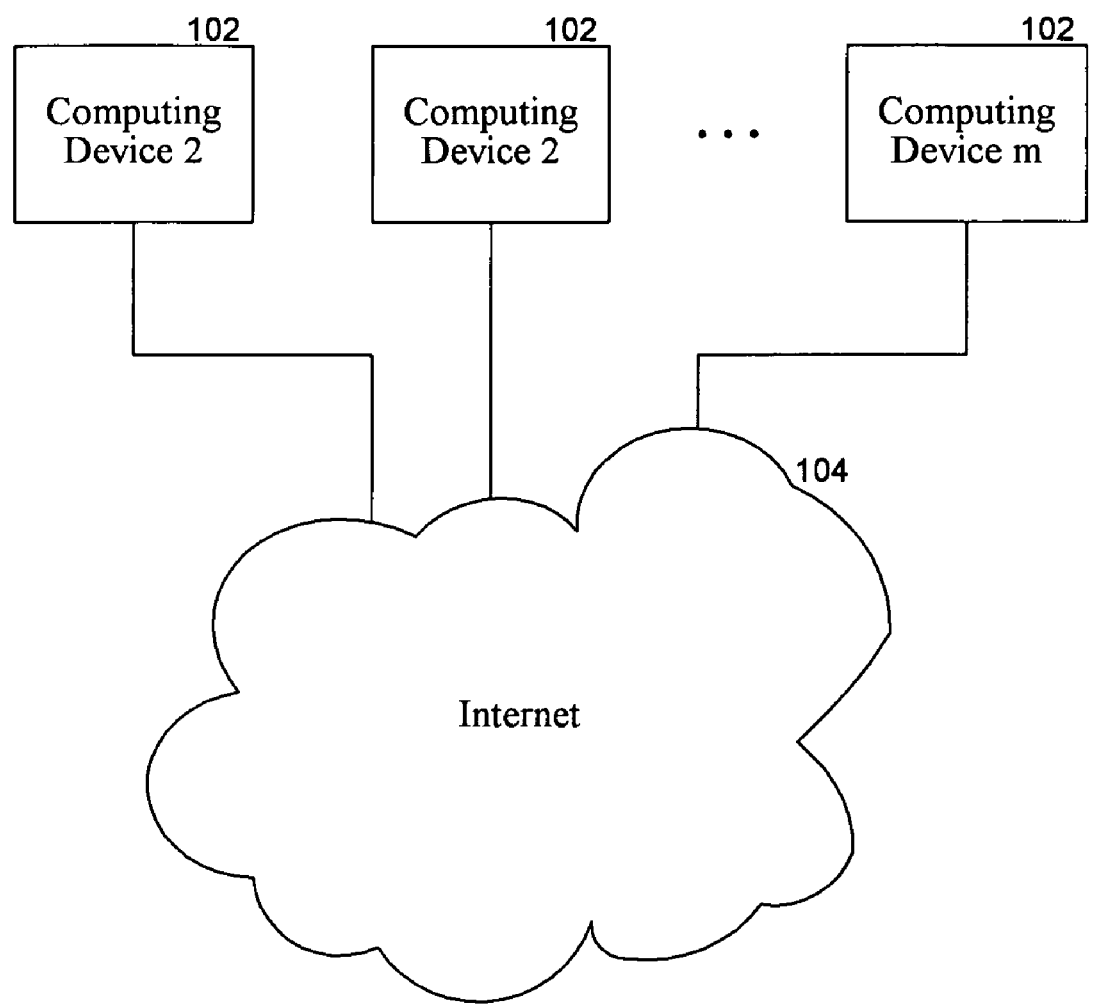
FIG. 1 is a block diagram illustrating an embodiment of a system for reducing information reception delays.

In an embodiment, a system for reducing information reception delays is provided. The system reduces delays by creating multiple connections between a sender computing device and a recipient computing device using a data communications protocol that guarantees order and delivery, such as TCP/IP. The system then may transmit messages from the sender computing device to the recipient computing device on multiple connections redundantly and nearly simultaneously. By using multiple connections to send similar data, the system may reduce data reception delays because even if messages sent using a connection are delayed, messages sent using another connection may not be delayed. The recipient computing device can then use the first arriving message and ignore or discard the subsequently arriving redundant messages. The system may dynamically add or remove connections depending on the extent of delays the system experiences. For example, the system may add connections if messages are not being received in a timely manner and remove connections if the same messages are consistently received in a timely manner on multiple connections. The system can thus be used to communicate information that is intolerant of data reception delays, e.g., audio or video information, using a protocol that guarantees order and delivery but does not guarantee time of delivery.

In an embodiment, the system for reducing information reception delays may send different forms of redundant data over multiple channels. As an example, the system may send "key" frames, which contain a full set of information, to the recipient computing device using a data connection, and may send key frames and "delta" frames, which contain only information that has changed since the last key frame was sent, on another connection. Then, a recipient computing device may still receive key frames in a timely manner from one of the multiple channels over which the key frames are sent, and may be able to tolerate delays in receiving delta frames. As an example, a key frame may contain a full video frame, and a delta frame may contain only the portions of the video frame that have changed. Because delta frames tend to be smaller in size than key frames, a sender may attempt to reduce, e.g., file size or network latency by using key and delta frames.

In an embodiment, a sending computing device sends various forms of information on multiple connections. As an example, the sending computing device may send high-resolution information on a connection, and may send lower-resolution information on another connection. A recipient computing device may wait for a period of time before determining which of the arriving messages to use. As an example, the recipient computing device may wait for a period of time to determine whether a message containing higher-resolution information arrives before using any of previously received messages containing lower-resolution information. As a further example, a sending computing device may send real-time video at thirty frames per second on a channel, and may send real-time video at fifteen frames per second on another channel. The recipient computing device may prefer to use the video arriving at thirty frames per second. However, if waiting for such frames would cause delays in presenting information (e.g., and thereby could cause video "jitters"), the system may use frames arriving on the other connection at fifteen frames per second. As another example, the sending computing device may send a 600 dots-per-inch image on a connection and a 300 dots-per-inch image on another connection. Again, the recipient computing device may select the best image given its time constraints.

In an embodiment, a sending computing device may send messages containing a large amount of information on a connection and may send messages containing smaller amounts of information on another connection. In such a case, an intermediate computing device that receives messages from the sending computing device and forwards it to a recipient computing device may cause delays because, e.g., it prioritizes forwarding of messages based on the size of the messages. The recipient computing device may prefer messages containing large amounts of information because, e.g., such messages may increase overall throughput, and so may wait for a period of time before determining whether to use an earlier-arriving message containing the smaller amount of information. However, waiting for a message containing the larger amount of information may result in overall delays, and so the recipient computing device may use the earlier-arriving message containing the smaller amount of information. As an example, a sending computing device may send messages containing 1,024 bytes of data on a connection and messages containing 256 bytes of data on another connection. Thus, four messages are sent on the second connection for every message sent on the first connection. If a recipient computing device receives the first of the four smaller messages and then receives the larger message after a threshold amount of time, the recipient computing device may use the data contained in the first smaller message (e.g., 256 bytes) and then the portion of the larger message not including the data contained in the first smaller message (e.g., last 768 bytes). Thus, the system minimizes delays in receiving the data.

In an embodiment, given a set of connections, the system may select a subset of the connections to send information. As examples, a subset of connections may be selected as a function of time or message number. Even numbered connections may be used to send even numbered messages. As a further example, a subset of connections may be randomly selected. By selecting a subset of connections randomly, the system may be less likely to be negatively affected by network latencies affecting some connections and not others.

Turning now to the figures, FIG. 1 is a block diagram illustrating an embodiment of a system for reducing information reception delays. The system includes multiple computing devices 102. The computing devices may be coupled to a network, such as an Internet 104. The computing devices may also be interconnected using other forms of networks such as an intranet (not shown). The connections to the intranet or Internet may use any type of network connection, including, e.g., wired or wireless connections.

Figure 2:
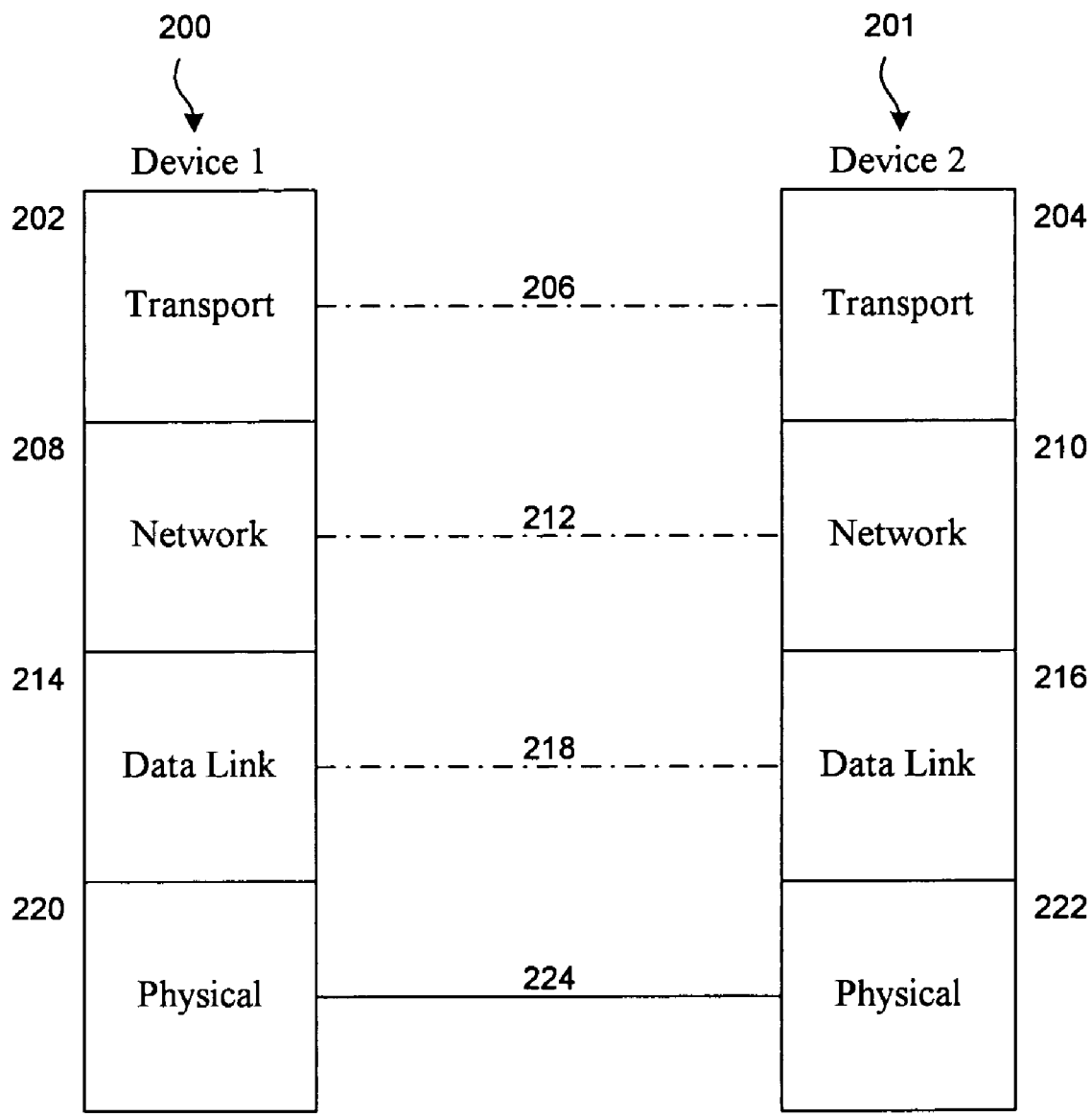
FIG. 2 is a block diagram illustrating an embodiment of a data communications stack employed by two computing devices of FIG. 1.

FIG. 2 is a block diagram illustrating an embodiment of a data communications stack employed by two computing devices of FIG. 1. Computing devices may use one or more data communications stacks to communicate with other computing devices. In the illustrated example, computer device 200 communicates with computing device 201 using data communications stacks. Computing device 200 has a data communications stack comprising a transport layer 202, network layer 208, data link layer 214, and physical layer 220. Computing device 201 similarly has a data communications stack comprising a transport layer 204, network layer 210, data link layer 216, and physical layer 222. The physical layers 220 and 222 may be connected via a network to form a physical connection 224. The computing devices 200 and 201 may each be connected to the Internet via, e.g., a modem, network interface card, or other connection. The Internet is comprised of various physical connections, such as telephone lines, microwave links, and other forms of wired and wireless physical connections, that together form multiple routes for messages. Indeed, an early goal for the Internet was to make it possible for a sender to communicate with a recipient despite network outages. Higher layers of the data communications stack, such as transport layers 202 and 204, may be connected by logical connections, such as logical connection 206. When computing device 200 sends messages to computing device 201, the messages may travel on different physical routes through the Internet. Although the messages may travel on a variety of physical layer routes, the logical layers may not need to be aware of these routes.

When two layers of a data communications stack have a logical connection and exchange data, the data may be sent "down" the data communications stack of the sending computing device to the "lowest" layer of the data communications stack, across a physical connection, and then "up" the data communications stack of the receiving computing device. As an example, when transport layer 202 communicates data to transport layer 204, the transport layer 202 may send the data to network layer 208. The network layer 208 in turn may send the data to data link layer 214, which may send it to the data link layer 216 by using physical layers 220 and 222 to ultimately communicate the data over the physical connection 224. Data link layer 216 then forwards the received data to network layer 210, which in turn forwards it to transport layer 204. In the illustration, the physical connection 224 is displayed with a solid line, and logical connections 206, 212, and 218 are illustrated using dot-dashed lines. The data communications stacks may have additional layers, such as application and session layers (not shown).

Figure 3:
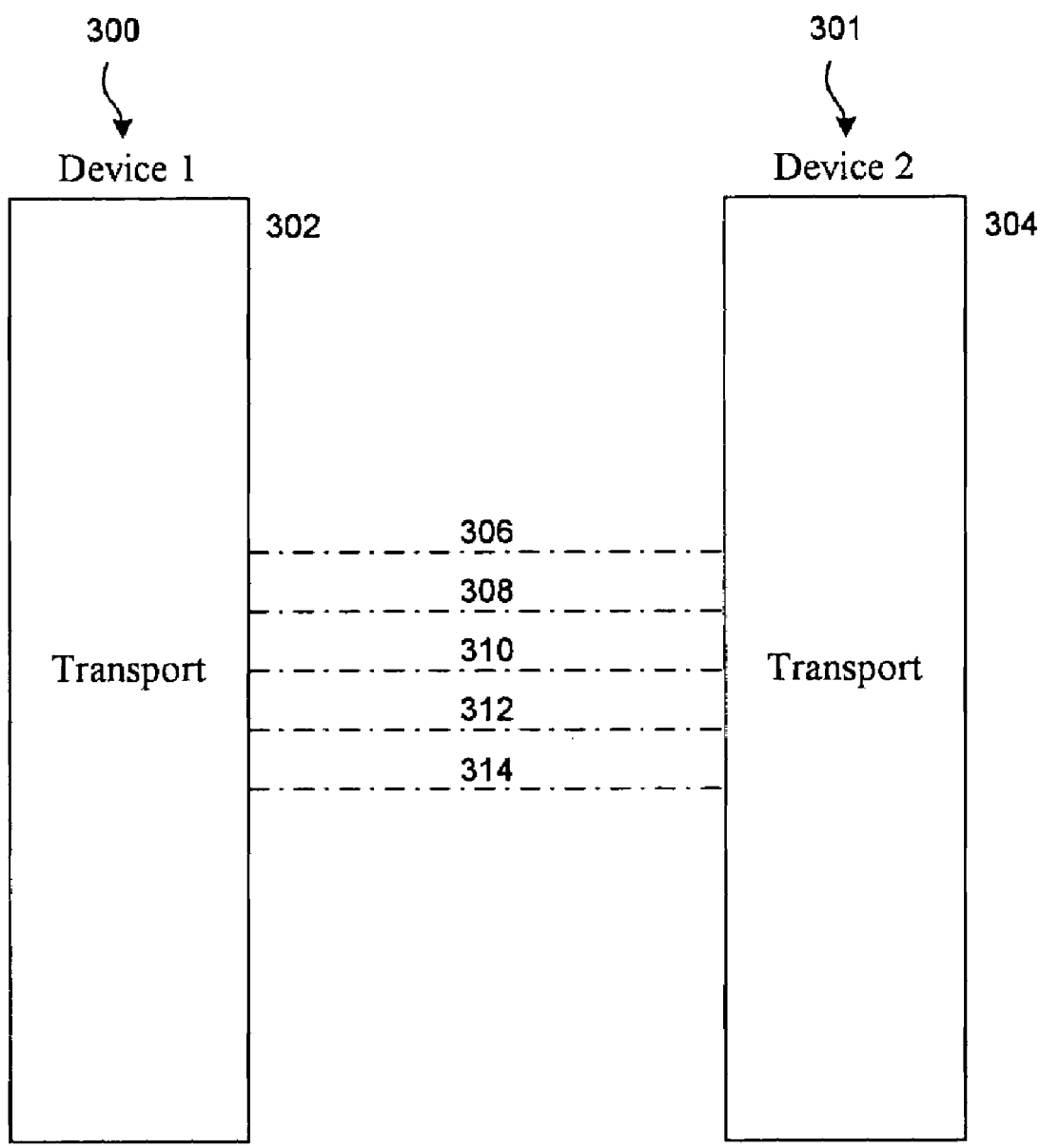
FIG. 3 is a block diagram illustrating an embodiment of a transport layer of the data communications stack of FIG. 2.

FIG. 3 is a block diagram illustrating an embodiment of a transport layer of the data communications stack of FIG. 2. In the illustrated embodiment, computing device 300 has in its data communications stack a transport layer 302. Similarly, communications device 301 has in its data communications stack a transport layer 304. Transport layers 302 and 304 may have a logical transport layer connection (or simply, "connection") 306, as described in relation to FIG. 2. However, in the embodiment illustrated in FIG. 3, transport layers 302 and 304 have multiple additional connections 308, 310, 312, and 314 between each other. The system may send redundant data over several of the multiple connections in an effort to reduce data reception delays. As an example, a message may be sent redundantly on connections 306, 308, 310, and 312 nearly simultaneously. If the receiving computing device does not receive messages on a timely basis, the two computing devices may add a connection 314 in an effort to minimize such delays. Alternatively, if redundant data is received on multiple connections in a timely basis, the system may remove one or more connections to free up system and network resources.

In an embodiment, the system may send key frames on a transport layer connection, such as connection 306, and key and delta frames on another connection, such as connection 308. Then, if the system is using key frames and these key frames are not being received in a timely manner, the system may use key and delta frames arriving on the other connection. Alternatively, if the system is using key and delta frames and such communications are not arriving in a timely manner, the system may use key frames arriving on the other connection. In a further attempt to minimize delays, the system may add additional connections to send key frames, delta frames, or all frames.

In an embodiment, the system may also send different types of information on different connections. As an example, the system may send vowel sounds on a connection, and consonant sounds on another connection.

Figure 4:
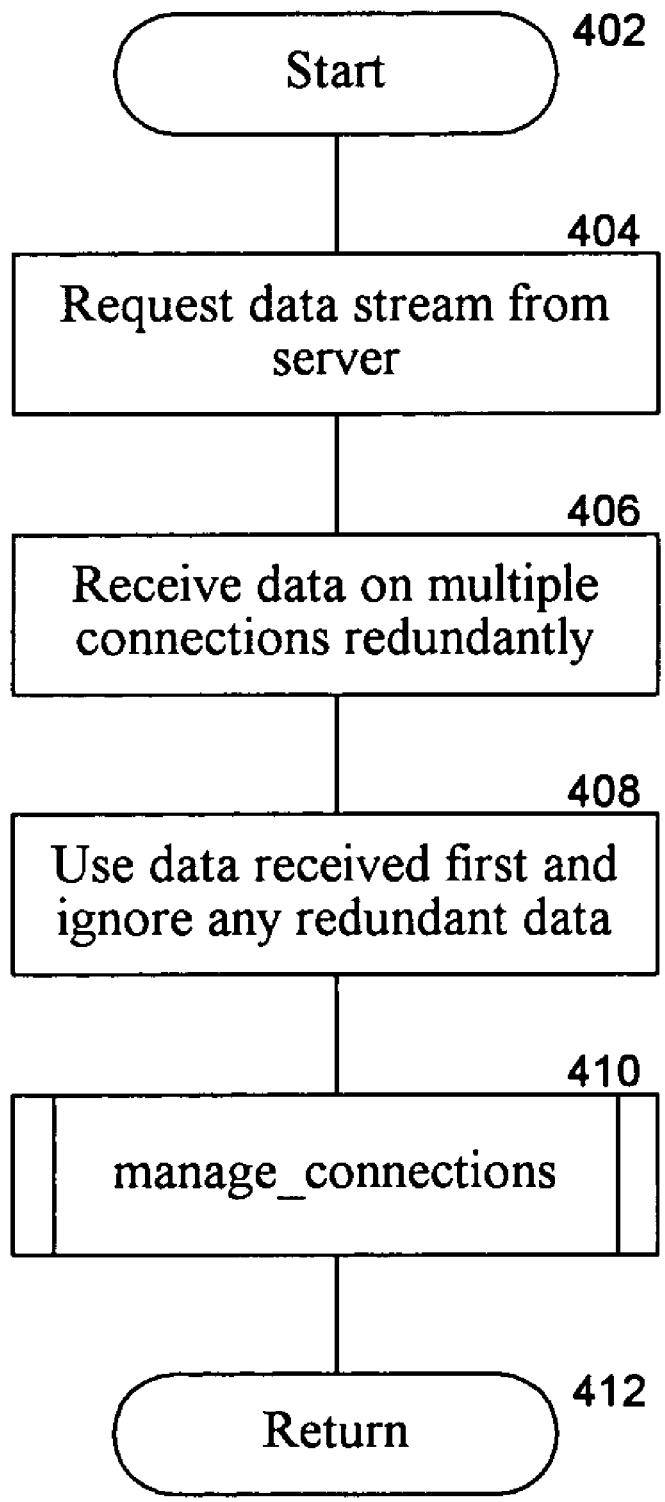
FIG. 4 is a flow diagram illustrating an embodiment of a receive_datastream routine.

FIG. 4 is a flow diagram illustrating an embodiment of a receive_datastream routine. The routine is performed by a client computing device to request and process data. The routine begins at block 402. At block 404 the routine requests a datastream from a server computing device. The datastream may be, for example, Voice over IP, other forms of streaming audio, streaming video, or any other type of information that may need to be delivered in real-time. Upon exchanging information relating to the datastream, the requesting client and the server may then negotiate to open multiple connections (not shown). At block 406, the routine receives data on the multiple connections redundantly. At block 408, the routine may use data contained in the message arriving first, and ignore redundant data in messages that arrive subsequently. As an example, when audio information is sent redundantly, multiple messages may contain identical audio information, and the receiving application would only need to play the first received audio information. As a further example, when key and delta frames are used, the routine may receive key frames in a connection and key and delta frames in another connection. In such a case, at block 408, the routine may use either just the key frames from the first connection or the key and delta frames from the second connection, depending on which arrives first. The key frames may contain key frame sequence numbers so that an application using frames from either connection would be able to determine which key frames and delta frames correspond to one another. At block 410, the routine call a manage_connections subroutine. At block 412, the routine returns to its caller.

Figure 5:
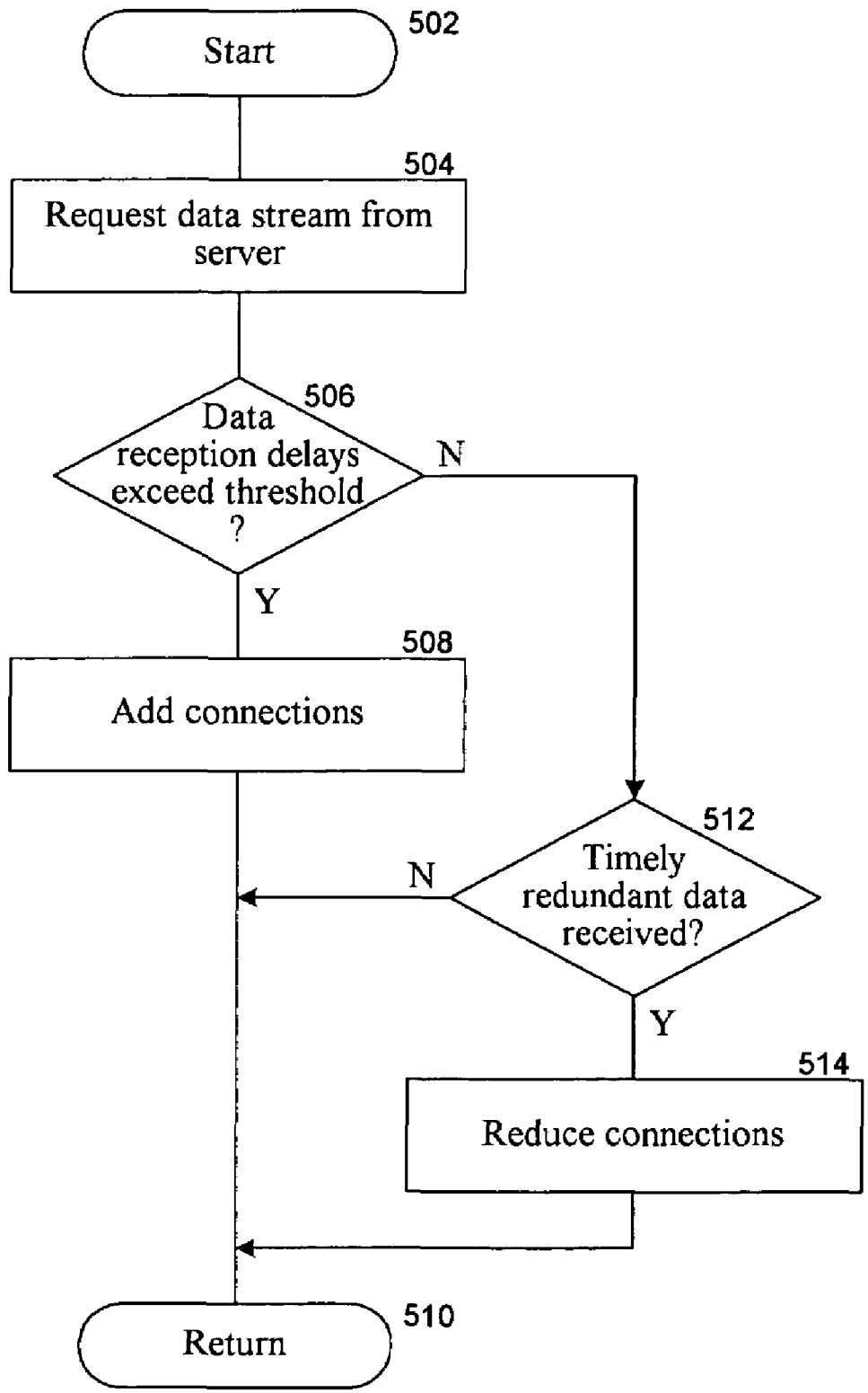
FIG. 5 is a flow diagram illustrating an embodiment of a manage_connections routine.

FIG. 5 is a flow diagram illustrating an embodiment of a manage_connections subroutine. The subroutine is performed by a client computing device to add or remove connections, as necessary, and begins at block 502. At block 504, the subroutine determines whether there have been data reception delays. As an example, the subroutine may determine whether an application needed to wait for a message to arrive after the application finished playing audio it had received in prior messages. At block 506, the subroutine determines whether the delay exceeds a threshold. As an example, some applications may tolerate delays better than others, and such applications may have a higher threshold value. If the threshold amount of time is exceeded, the subroutine adds additional connections at block 508. The subroutine may add one or more connections depending on the amount of delay. As an example, if the delay was significant, the subroutine may add multiple connections. The subroutine then continues at block 510. By adding or removing connections, the subroutine attempts to reduce information reception delays and prevent network congestion caused by unnecessary transmission of redundant information.

If the data reception delay did not exceed the threshold at block 506, the subroutine continues at block 512, where it determines whether redundant data was received in a timely basis on multiple connections. As an example, if the same data is received on multiple connections at about the same time, the subroutine may determine that too many connections are being used. These connections may be valuable system or network resources that could be more effectively used by other applications. If redundant data was timely received on multiple connections, at block 514 the subroutine may reduce the number of connections it is employing. The subroutine then continues at block 510.

The subroutine returns to its caller at block 510.

Figure 6:
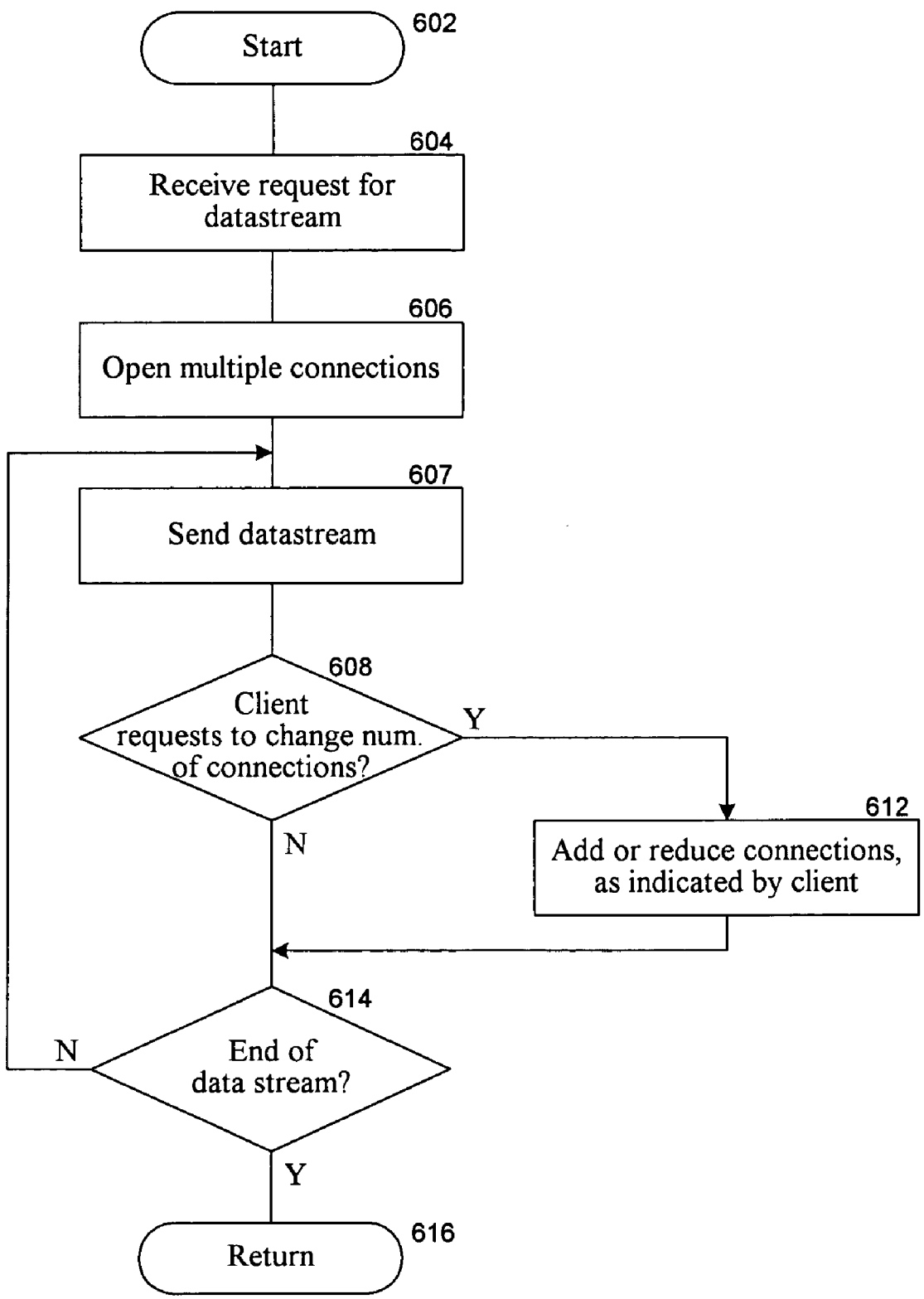
FIG. 6 is a flow diagram illustrating an embodiment of a serve_datastream routine.

FIG. 6 is a flow diagram illustrating an embodiment of a serve_datastream routine. The routine is performed by a server computing device. The routine begins at block 602. At block 604, the routine receives a request for a datastream from a client computing device. At block 606, the routine opens multiple connections to the client computing device. In an embodiment, the routine may open a large number of connections when the datastream contains high-quality audio or video, or a smaller number of connections when the datastream contains lower-quality audio or video. At block 607, the routine sends a portion of the datastream to the client computing device. As an example, the routine may send the first few seconds of an audio or video datastream. At block 608, the routine determines whether the client has requested to change the number of connections. The client may have requested such a change when, e.g., the messages relating to the datastream being sent by the routine are (or are not) being received in a timely manner by the client computing device. If the client computing device has requested to change the number of connections, the routine continues at block 612. Otherwise, the routine continues at block 614. At block 612, the routine adds (or reduces) a number of connections, as indicated by the client computing device. In an embodiment, the server computing device determines the number of connections.

At block 614, the routine determines whether it has reached the end of the datastream it is sending to the client computing device. If that is the case, the routine continues at block 616. Otherwise, the routine continues at block 607. At block 616, the routine returns to its caller.

Although particular examples discussed herein refer to using TCP, alternate embodiments may use other data communications protocols that guarantee order and delivery, but not time of delivery.

The computing device on which the system for reducing information reception delays is implemented may include a central processing unit, memory, input devices (e.g., keyboard and pointing devices), output devices (e.g., display devices), and storage devices (e.g., disk drives). The memory and storage devices are computer-readable media that may contain instructions that implement the security system. In addition, the data structures and message structures may be stored or transmitted via a data transmission medium, such as a signal on a communications link. Various communications links may be used, such as the Internet, a local area network, a wide area network, or a point-to-point dial-up connection.

FIG. 1 illustrates an example of a suitable operating environment in which the system for reducing information reception delays may be implemented. The operating environment is only one example of a suitable operating environment and is not intended to suggest any limitation as to the scope of use or functionality of the system. Other well-known computing systems, environments, and configurations that may be suitable for use include personal computers, server computers, hand-held or laptop devices including "smart" cellular telephones, multiprocessor systems, microprocessor-based systems, programmable consumer electronics, network PCs, minicomputers, mainframe computers, distributed computing environments that include any of the above systems or devices, and the like.

The system for reducing information reception delays may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method performed by a computer system for reducing information reception delays using a protocol that guarantees order and delivery of messages, comprising:
    under control of a sender computing device,
        creating multiple connections using the protocol between the sender computing device and a recipient computing device;
        transmitting original messages on a created connection to the recipient computing device, the original messages containing key frames;
        transmitting a redundant copy of the original messages on another created connection to the recipient computing device, the redundant copy of the original messages containing key frames and delta frames; and
    under control of the recipient computing device,
        receiving the original messages on the created connection, the original messages containing key frames;
        receiving the redundant copy of the original messages on the other created connection, the redundant copy of the original messages containing key frames and delta frames;
        storing the received delta frames;
        when a message containing a key frame is not received within a specified period of time, using delta frames received after a previously received key frame; and
        discarding the unused messages.

2. The method of claim 1 wherein the protocol is TCP.

3. The method of claim 1 wherein Nagling is disabled.

4. The method of claim 1 wherein a Voice over IP application uses the messages.

5. A system for reducing information reception delays using a protocol that guarantees order and delivery of messages, comprising:
    a component that creates a first connection and a second connection using the protocol between a sender computing device and a recipient computing device; and
    a component that transmits messages containing key frames on the first created connection and delta frames on the second created connection to the recipient computing device so that when a transmitted key frame does not arrive at the recipient computing device within a specified period of time after the recipient computing device receives a previously transmitted key frame, the recipient computing device uses delta frames that it received after receiving the previously transmitted key frame, wherein the key and delta frames are associated by a frame sequence number.

6. The system of claim 5 wherein the recipient computing device comprises:
   a component that receives a first set of messages on a first created connection;
   a component that receives a second set of messages on a second created connection; and
   a component that uses the set of messages received first; and discards the messages subsequently received.

7. The system of claim 5 wherein the protocol is TCP.

8. The system of claim 5 wherein Nagling is disabled.

9. The system of claim 5 wherein a Voice over IP application uses the messages.

10. A system for reducing information reception delays using a protocol that guarantees order and delivery of messages, comprising:
   a component that creates a first connection and a second connection using the protocol between a sender computing device and a recipient computing device; and
   a component that transmits to the recipient computing device messages containing higher-resolution information on the first created connection and messages containing lower-resolution information on the second created connection wherein the recipient computing device waits for a period of time before determining which received message contains a highest resolution of information and uses the received message containing the highest resolution of information.

11. The system of claim 10 wherein the information includes images.

12. The system of claim 10 wherein the information includes audio.

13. The system of claim 10 wherein transmitting messages includes transmitting information of a first size on a connection and transmitting information of another size on another connection.

14. The system of claim 13 wherein the sizes are unequal.

15. A computer-readable medium having computer-executable instructions for performing steps, comprising:
   creating multiple connections between a sender computing device and a recipient computing device using a protocol that guarantees order and delivery;
   transmitting original messages on a first created connection to the recipient computing device, the original messages containing key frames; and
   transmitting a redundant copy of the original messages on a second created connection to the recipient computing device, the redundant copy of the original messages containing delta frames so that when a message containing a key frame does not arrive within a specified period of time, delta frames received after a previously received key frame are used.

16. The computer-readable medium of claim 15 further including computer-executable instructions for performing steps, comprising:
   receiving the original messages on the first created connection;
   receiving the redundant copy of the original messages on the second created connection;
   using the messages that were received first; and
   discarding the messages received after the messages that were received first.

17. The computer-readable medium of claim 15 wherein the protocol is TCP.

18. The computer-readable medium of claim 15 wherein a Voice over IP application uses the messages.

19. A computer-readable medium having computer-executable instructions for performing steps, comprising:
   receiving original messages on a created connection, the original messages containing key frames;
   receiving a redundant copy of the original messages on another created connection, the redundant copy of the original messages containing delta frames;
   storing the redundant copy of the original messages containing delta frames;
   when an original message containing a key frame does not arrive for a period of time, using the redundant copy of the original messages that was received after a previously received original message; and
   discarding the unused messages.

* * * * *